April 28, 1953  A. A. LOMBARD  2,636,666
GAS TURBINE ENGINE WITH DE-ICING APPARATUS
Filed Aug. 9, 1948  3 Sheets-Sheet 1

INVENTOR
ADRIAN A. LOMBARD
by Wilkinson & Mawhinney
Attorneys

April 28, 1953  A. A. LOMBARD  2,636,666
GAS TURBINE ENGINE WITH DE-ICING APPARATUS
Filed Aug. 9, 1948  3 Sheets-Sheet 3

INVENTOR
ADRIAN A. LOMBARD
by Wilkinson & Mawhinney
Attorneys

Patented Apr. 28, 1953

2,636,666

UNITED STATES PATENT OFFICE 2,636,666

GAS TURBINE ENGINE WITH DE-ICING APPARATUS

Adrian Albert Lombard, Allestree, England, assignor to Rolls-Royce Limited, Derby, England, a British company Application August 9, 1948, Serial No. 43,298
In Great Britain August 20, 1947

6 Claims. (Cl. 230—132)

This invention relates to gas-turbine engine installations.

A gas-turbine engine normally comprises a compressor drawing air from the atmosphere and compressing it prior to delivery to combustion equipment in which fuel is burnt and from which the combustion products pass to the turbine to drive it. The turbine drives the compressor through a shaft and may also drive an airscrew or airscrews (which term includes a ducted fan).

In an aircraft installation including a gas-turbine engine, it is usual to provide in the air-intake duct to the compressor, a guard grid which extends across the duct to prevent foreign matter, such as stones, which is carried into the duct in the air stream from entering and damaging the blading of the compressor. Such an arrangement, however, has the disadvantage that when the aircraft is flying under icing conditions, ice may form rapidly on the grid, choking the duct and restricting or completely cutting off the flow of air to the compressor.

To avoid this difficulty it has been proposed that hot gas should be injected into the air stream to heat it, for example, by providing at the inlet to the duct a grid-like structure of hollow members into which exhaust gas from the turbine is delivered and from which the hot gas passes through suitable ports into the air stream. While such an arrangement is considered to be generally satisfactory, under very severe icing conditions, or on failure of the hot gas supply, ice formation may still occur on the guard grid.

It is an object of this invention to provide a gas-turbine engine installation in which an adequate supply of air is maintained to the compressor of the gas-turbine engine even when the guard grid provided in the air-intake is choked.

According to this invention there is provided a gas-turbine engine installation having an air-intake duct with a guard grid extending across the duct in the normal path of the air stream through the duct and having in the wall of the duct an auxiliary air-duct to by-pass the guard grid so that when the grid is choked air can pass around the grid, said auxiliary air duct being formed as a density-separator so that particles of matter such as stones, entrained in the air stream are deposited in the auxiliary air-duct during passage therethrough. Thus with the air-intake construction of this invention, under normal operating conditions the air passing to the compressor passes substantially wholly through the grid, and in the event of the grid becoming choked, for example under severe icing conditions, an adequate supply of air passes to the compressor through the auxiliary air-duct and any foreign matter in the air that may damage the compressor blading is deposited within the auxiliary air-duct.

According to a feature of this invention the auxiliary air-duct is also formed so that any matter deposited in it is discharged therefrom through a suitable outlet.

In a preferred construction of air-intake duct of this invention the auxiliary duct is in the form of an annular channel formed in the outer wall of the air-intake duct to surround the guard grid and to open to the air-intake duct on each side of the guard grid and the annular channel is formed with such a cross section in the direction of the flow of the air that the air is constrained to follow a non-rectilinear path when flowing through it.

The construction of air-intake duct in this invention is preferably employed in combination with means of the kind above referred to for injecting hot gas into the air stream, upstream of the guard grid. Such means, for example, take the form described in the specifications of United States Serial No. 788,990 filed December 1, 1947, or United States Serial No. 32,864, filed June 14, 1948, or United States Serial No. 35,916 filed June 29, 1948.

Two embodiments of this invention will now be described with reference to the accompanying drawings in which.

Figure 1:
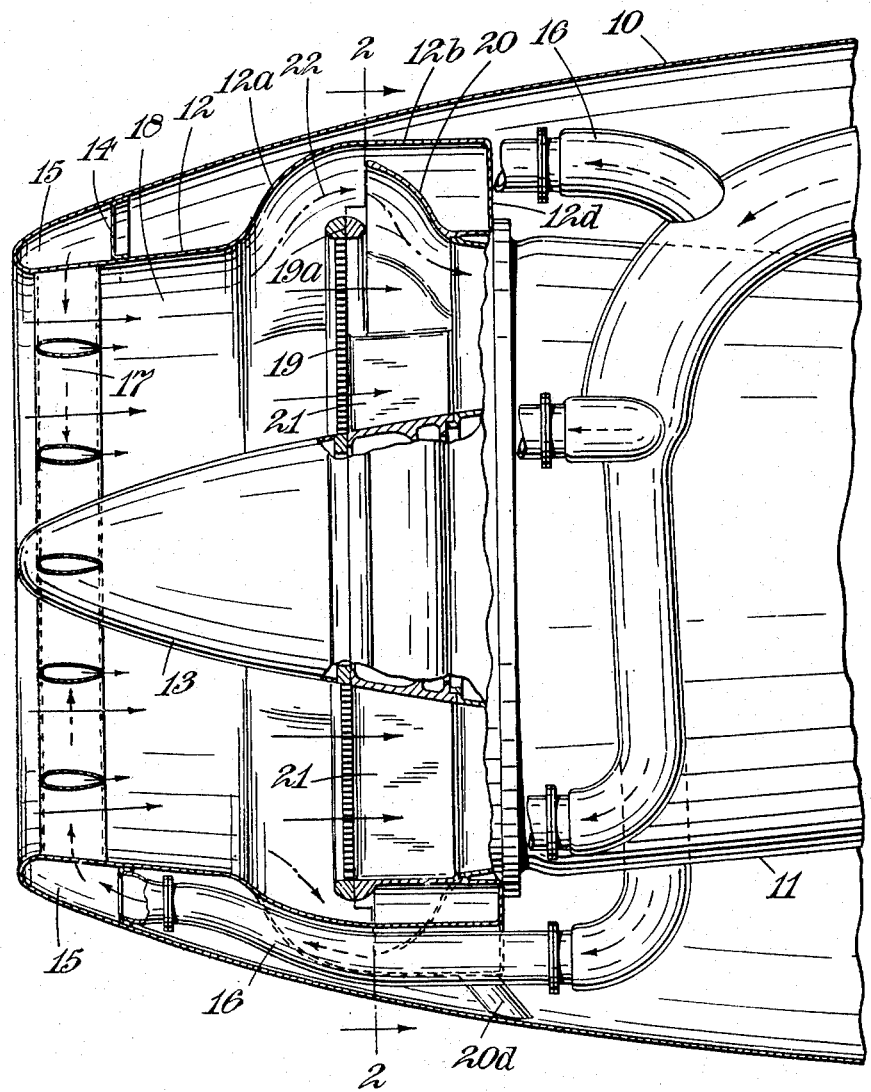
Figure 1 illustrates the air-intake end of a gas turbine engine aircraft installation with parts shown in section on the line 1—1 of Figure 2.
Figure 2:
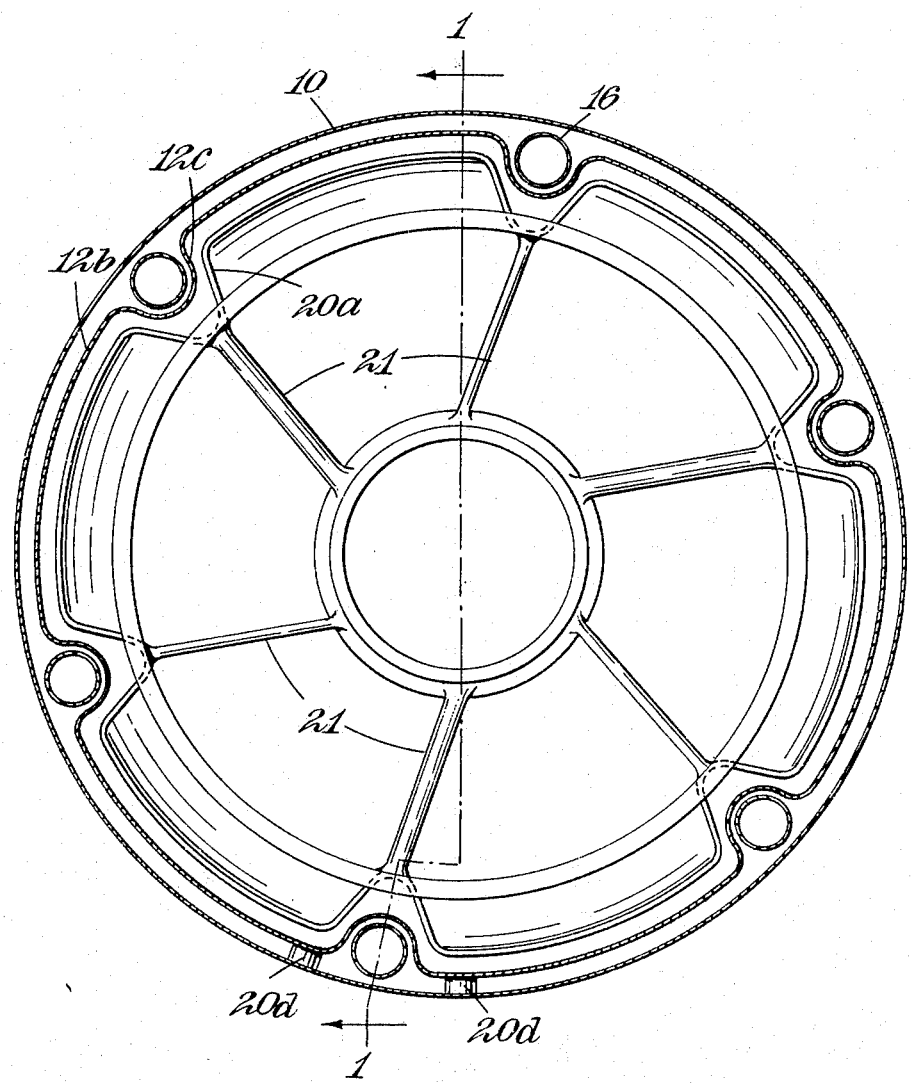
Figure 2 is a section on the line 2—2 of Figure 1.

Referring to Figures 1 and 2 there is illustrated the air-intake end of a gas-turbine engine installation in a nacelle 10 forming part of an aircraft. The gas-turbine engine may be of any suitable construction and is illustrated as having an axial compressor 11, whereof the air-intake duct is of annular form and is bounded by walls formed by the leading portion 12 of the nacelle and a substantially conical fairing 13 supported from the compressor casing.

A partition member 14 is secured within the leading portion 12 of the nacelle to form an annular chamber 15 in the leading edge of the nacelle to which chamber 15 hot gas from the engine is delivered through conduits 16. The hot gas is fed from the annular chamber 15 into a wide mesh grid-like structure 17 formed from a hollow members having outlets in their trailing edges so that the hot gas fed into the grid-like structure is delivered into the air-intake duct 18 to heat the air flowing into it and thus to reduce the possibility of ice formation in the air intake and on the compressor parts.

Between the grid-like structure 17 and the inlet end of the compressor 11 there is provided a guard grid 19 of wire mesh and the guard grid extends across the air-intake duct 18 so as to lie in the normal path of air flow to the compressor. The guard grid serves to prevent any foreign matter such as stones from entering the compressor and damaging the compressor blading.

The arrangement above described is considered satisfactory under most flying conditions of an aircraft but under very severe icing conditions or on failure of the hot gas supply choking of the guard grid 19 by ice formation thereon may occur, so that the supply of air to the compressor would be restricted or even prevented.

To avoid this difficulty the following arrangement is adopted.

The rear portion of the wall 12 of the outer air-intake duct defining wall is curved outwardly and rearwardly as indicated at 12a, to have its maximum diameter substantially in the plane of the guard grid 19. The wall 12 beyond the curved portion 12a is substantially cylindrical and extends rearwardly to adjacent the plane of the intake end of the compressor 11.

A fairing member 20 is secured to the inlet end of the compressor 11 and this fairing member curves outwardly and forwardly to have its maximum diameter adjacent the plane of the guard grid 19 but to have its outer edge spaced radially from the curved portion 12a of the wall 12. There is thus formed around the guard grid a by-pass through which the air will be constrained to flow if the guard grid 19 is choked and the air in flowing through the by-pass will first flow outwardly and will then flow inwardly changing its direction of flow substantially in the plane of the guard grid.

To accommodate the conduits 16, the cylindrical portion 12b of the wall 12 and the fairing 20 are radially inwardly indented, as will be more clearly seen at 12c and 20a in Figure 2, the extent of radial indentation being such that the gap between the forward edge of the fairing 20 and the wall 12 is maintained. The radial indentations 20a are also employed to support the rim 19a of the guard grid and also to provide points of connection for the struts 21 which extend across the air-intake to support the conical fairing 13 within the air intake. The struts 21 may also be employed to support the guard grid 19.

During normal operation of the plant, air entering the intake 18 passes substantially wholly through the guard grid 19 which removes from the air stream any undesired foreign matter thereby preventing damage to the compressor blading. In the event that the guard grid 19 becomes choked, for example under severe icing conditions, the air, instead of passing through the guard grid passes outwardly from the main air intake 18 into the annular channel formed between the curved part 12a of the wall 12 of the curved fairing 20 and is then deflected inwardly by the fairing 20 back into the main air-intake duct and thereby by-passing the guard grid. As the direction of air flow, indicated by the chain-like arrows 22, changes from outwardly to inwardly, any particles of matter which are heavier than air, such for example as particles of ice or grit, are, by virtue of their outward momentum, deposited in the bottom of the channel adjacent the gap between the radially outer edge of the fairing 20 and the cylindrical portion 12b of the wall and are then discharged from the annular channel through this gap so as to pass into the space formed by fairing 20, wall 12b and end wall 12d. The foreign matter is discharged from this space to externally of the nacelle 10 through a discharge orifice 20d at the lower part of the nacelle assisted by the leakage of air pressurized by the forward flight of the aircraft.

It will be seen that even if the guard grid becomes choked an adequate supply of air will be maintained to the compressor for operation of the engine and that any particles that might otherwise damage the compressor blades are removed from the air passing through the by-pass by a density separator action.

Figure 3:
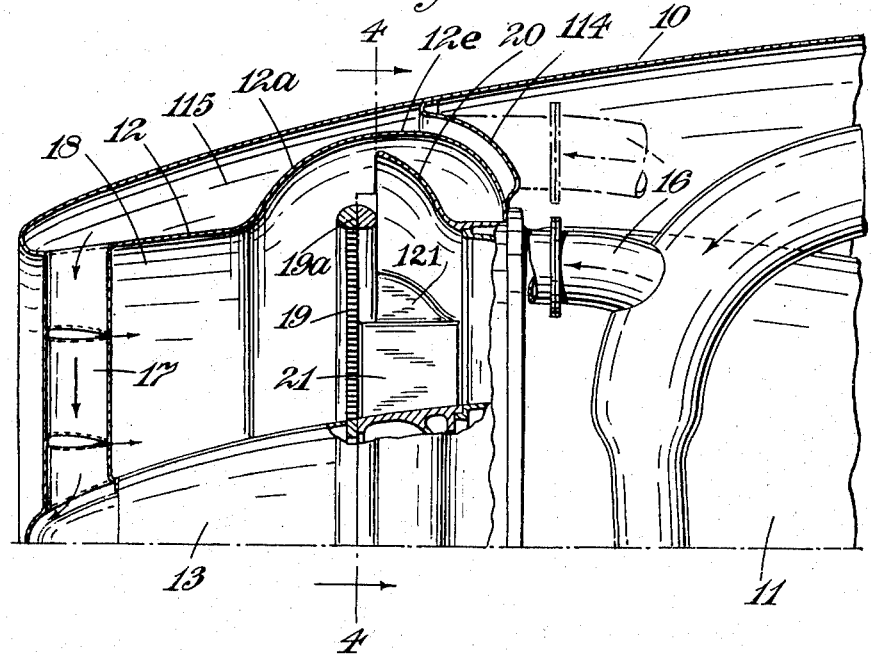
Figure 3 is a view of an alternative arrangement and corresponds to Figure 1 and is a section on the line 3—3 of Figure 4.
Figure 4:
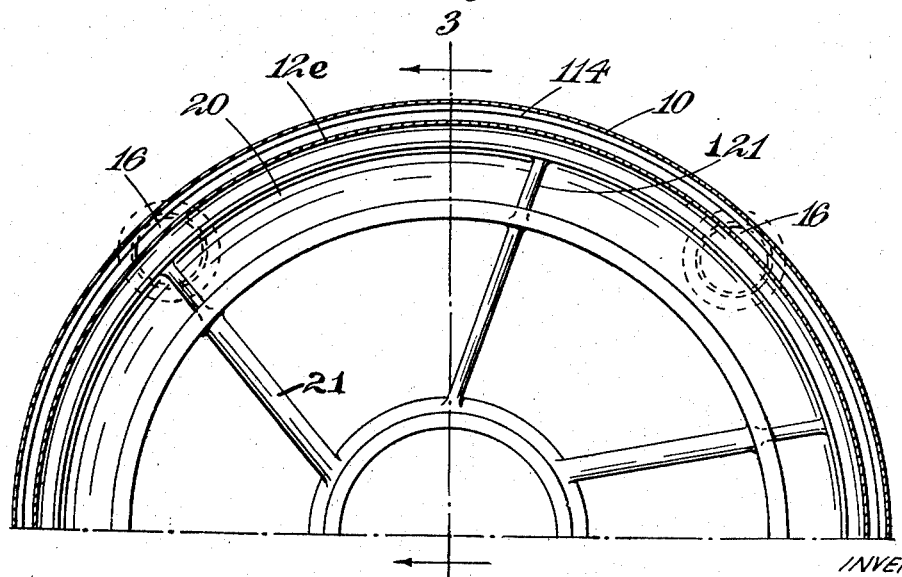
Figure 4 is a section on the line 4—4 of Figure 3.

Referring now to Figures 3 and 4 in which the reference numerals employed in Figures 1 and 2 are used to indicate like parts, instead of providing a partition 14, on the upstream side of the auxiliary air-intake duct by-passing the guard grid 19 a partition 114 is located in the nacelle between the outer wall thereof and the inlet end of the compressor to form a chamber 115 receiving the hot gas from the conduits 16, which chamber completely surrounds the air intake. Moreover, instead of the rear portion of the wall 12 being substantially cylindrical it is curved inwardly behind the fairing 20 as indicated at 12e, to form an annular chamber behind the fairing 20.

Since the conduits do not extend forwardly of the guard grid by-pass the parts 12a and 12e of the wall 12 and the fairing 20 can be made of completely annular form, thus increasing the effective area of the by-pass.

The guard grid 19 and the struts 21 are supported from the fairing 20 by extensions 121 of the struts 21.

It will be clear that a gas-turbine engine installation having an air intake duct structure, as above described should be capable of operating under the most severe icing conditions.

It will be understood that the invention is not limited to the constructions above described, for example, the invention is applicable to gas turbine engine installations in which the gas-turbine engine has a centrifugal compressor. Moreover, if desired the means for supplying the hot gas in the air-intake may be omitted or may take the form described in the specification of United States application Serial No. 32,864 filed June 14, 1948. The invention is also applicable to gas turbine engine installations having an airscrew or airscrews located in front of or adjacent to the leading edge of the air-intake duct and in this case the means for supplying hot gas conveniently takes the form described in the specification of United States application Serial No. 35,916 filed June 29, 1948.

I claim:

1. In a gas-turbine installation of the class comprising a compressor and air-intake means having at least an outer wall structure defining an air passage with an inlet at one end of the structure and an outlet to the compressor at the opposite end of the structure, the combination with a guard grid located in said air passage downstream of the inlet to extend wholly across the normal path of air flow in said passage to prevent debris being carried by the air flowing through the air passage from said inlet to said outlet, of density-separator means provided in said outer wall structure and surrounding the periphery of said guard grid outside the normal path of air through said passage, said density separator means comprising a first wall portion which is outwardly and rearwardly curved and extends from upstream of the guard grid to have its maximum diameter substantially in the plane of the guard grid, and a second wall portion which is outwardly and forwardly curved and extends from downstream of the guard grid to have its forward edge substantially in the plane of the guard grid and spaced radially inwardly from the part of maximum diameter of the first wall portion, said first and second wall portions together forming an annular channel of curved section in the direction of air flow communicating with the air passage on each side of the guard grid whereby, when the guard grid is choked, air is constrained to flow out from its normal path upstream of the guard grid first into the annular channel and then inwardly from the annular channel back into the air passage downstream of the guard grid, debris entrained in the air being deposited in the annular channel.

2. A gas-turbine installation as claimed in claim 1, comprising also outlets from said annular channel to beyond said outer wall structure.

3. A gas-turbine installation as claimed in claim 1, wherein the said first wall portion comprises an extension rearwardly beyond the plane of the guard grid to surround said second wall portion and to form therewith a collector space for debris deposited within the annular channel.

4. A gas-turbine installation as claimed in claim 3, comprising also means to inject hot gas into the air passage, said means being located upstream of the guard grid and annular channel.

5. A gas-turbine installation comprising a compressor and air intake means having an inlet thereto and an outlet therefrom to the compressor and including a wall structure defining an air flow passage leading from said inlet to said outlet, a guard grid located within said wall structure in said air flow passage downstream of said inlet and dimensioned to extend wholly across the direct flow path from said inlet to said outlet, said wall structure including outside said direct flow path and surrounding said guard grid in spaced relation thereto upstream and downstream curved wall portions together defining an annular channel affording a curved flow path communicating with said direct flow path both upstream of said guard grid and downstream of said guard grid, the downstream edge of said upstream curved wall portion being radially-spaced outwardly from the upstream edge of the downstream curved wall portion to form an annular gap whereby when the guard grid is choked air flowing in said air flow passage by-passes the guard grid by flowing out from said direct flow path at a location upstream of the guard grid, through said curved flow path, to pass the guard grid, and then back into the direct flow path on the downstream side of said guard grid and whereby when air flows in said auxiliary curved flow path debris entrained in the air passes through the upstream portion of said annular channel and through the annular gap.

6. A gas turbine installation comprising a compressor and air intake means having an inlet thereto and an outlet therefrom to the compressor and including a wall structure defining an air flow passage leading from said inlet to said outlet, a guard grid located within said wall structure in said air flow passage downstream of said inlet and dimensioned to extend wholly across the direct flow path from said inlet to said outlet, said wall structure including outside said direct flow path and surrounding said guard grid in spaced relation thereto, curved wall portions upstream and downstream of said guard grid and together defining an annular channel affording a curved flow path communicating with said direct flow path both upstream of said guard grid and downstream of said guard grid, the downstream edge of the upstream curved wall portion being radially outwardly spaced from the upstream edge of the downstream curved wall portion to provide an annular gap therebetween whereby when said guard grid is choked air flowing in said air flow passage by-passes the guard grid by flowing out from said direct flow path at a location upstream of the guard grid, through said curved flow path to pass the guard grid, and then back into the direct flowpath on the downstream side of the guard grid, and a further wall portion extending from the downstream edge of the upstream curved wall portion around the downstream curved wall portion to join the wall structure downstream of the guard grid, whereby an annular chamber is formed between said further wall portion and said downstream curved wall portion, which chamber has said annular gap as a forwardly-facing intake thereto and is closed at its downstream end, whereby when air flows in said curved flow path debris entrained in the air enters said forwardly-facing intake and is deposited in said chamber.

ADRIAN ALBERT LOMBARD.

References Cited in the file of this patent

UNITED STATES PATENTS

| Number | Name | Date |
|---|---|---|
| 1,864,201 | Kegerreis | June 21, 1932 |
| 2,404,275 | Clark | July 16, 1946 |
| 2,474,068 | Sammons | June 21, 1949 |
| 2,482,720 | Sammons | Sept. 20, 1949 |
| 2,508,288 | Owner | May 16, 1950 |